United States Patent
Pohlan

(10) Patent No.: US 7,882,080 B2
(45) Date of Patent: Feb. 1, 2011

(54) METHOD FOR OPERATING AN AUTOMATION SYSTEM

(75) Inventor: Rudolf Pohlan, Waldbronn (DE)

(73) Assignee: Siemens Aktiengesellschaft, Munich (DE)

( * ) Notice: Subject to any disclaimer, the term of this patent is extended or adjusted under 35 U.S.C. 154(b) by 364 days.

(21) Appl. No.: 12/072,850

(22) Filed: Feb. 28, 2008

(65) Prior Publication Data

US 2008/0222194 A1 Sep. 11, 2008

(30) Foreign Application Priority Data

Mar. 5, 2007 (EP) .................................. 07004481

(51) Int. Cl.
*G06F 17/30* (2006.01)

(52) U.S. Cl. ..................................................... 707/684

(58) Field of Classification Search ................... 707/684
See application file for complete search history.

(56) References Cited

U.S. PATENT DOCUMENTS

| | | | |
|---|---|---|---|
| 6,192,378 B1 | 2/2001 | Abrams et al. | |
| 7,299,277 B1 * | 11/2007 | Moran et al. | 709/224 |
| 7,305,485 B2 * | 12/2007 | Chang et al. | 709/232 |
| 7,600,007 B1 * | 10/2009 | Lewis | 709/223 |
| 7,725,570 B1 * | 5/2010 | Lewis | 709/224 |
| 7,725,571 B1 * | 5/2010 | Lewis | 709/224 |
| 7,730,172 B1 * | 6/2010 | Lewis | 709/224 |
| 2006/0064421 A1 * | 3/2006 | Futagawa | 707/10 |

FOREIGN PATENT DOCUMENTS

| | | |
|---|---|---|
| EP | 1 146 442 A2 | 10/2001 |
| WO | WO 00/36501 A1 | 6/2000 |

OTHER PUBLICATIONS

James E. Archer Jr., Richard Conway and Fred B. Schneider; "User Recovery and Reversal in Interactive Systems"; ACM Transactions on Programming Languages and Systems; Jan. 1984; pp. 1-19; vol. 6, No. 1; XP-002268944.

* cited by examiner

*Primary Examiner*—Neveen Abel Jalil
*Assistant Examiner*—Mark Andrew X Radtke

(57) ABSTRACT

There is described a method for operating an automation system, in which automation-specific data is filed in a database, an access to the data taking place using a database interface, all access to the data taking place via one and the same database interface and when an access to the database takes place, a datum to which the access relates is identified by a unique reference, in which on the datum identified via the reference a buffer is formed or used and a status of the datum is backed up in the buffer.

10 Claims, 2 Drawing Sheets

METHOD FOR OPERATING AN AUTOMATION SYSTEM

CROSS REFERENCE TO RELATED APPLICATIONS

This application claims priority of European Patent Office application No. 07004481.3 EP filed Mar. 5, 2007, which is incorporated by reference herein in its entirety.

FIELD OF INVENTION

The invention relates to a method for operating an automation system.

BACKGROUND OF INVENTION

The automation system comprises or has access to a database in which automation-system-specific data is or can be filed. Eligible as automation-system-specific data are e.g. one or more control programs or sections of such control programs.

Different high-level languages have been developed for formulating control programs, so the database can comprise sections of such control programs in different high-level languages. Eligible here as high-level languages are, in particular, representation in the form of a function plan (FUP) or representation in the form of a contact plan (KOP). To access the data which the database comprises, appropriate tools, i.e. editors or development environments for example, are provided, by means of which the data can be created, modified or deleted.

An access to the data takes place using a database interface, and does so in such a way that all accesses to the data in the database takes place via one and the same database interface. When an access is made to the database, the particular datum to which the access relates is identified by a unique reference, e.g. by a reference in the manner of a filename or by a reference with an otherwise suitably selected unique identifier. Also eligible here is the address at which the particular datum is stored in the database, i.e. in particular its initial address in the database.

The term "datum" designates here and below any user-definable combination of simple, compound or abstract data types. Correspondingly, the terms "datum" and "object" are used synonymously.

SUMMARY OF INVENTION

An undoing of user operations, i.e. accesses to such databases, or the redoing of previously undone operations are services which are nowadays expected by modern software programs as a system service. The user operations are carried out by an action, i.e. a user operation, which precedes or initiates the access to the database—generally by means of an input device such as the computer keyboard or mouse. In particular, delete procedures performed accidentally are examples of the wish for a facility for being able to undo user operations again.

The user operation, more precisely the access to the database initiated thereby, manipulates data in the database which is managed by the software program. A typical problem now consists in finding a method which supports the undoing or redoing of user operations on object models which are complex in database engineering terms, the complexity arising due to a possible variety of relations and dependencies between the data which the database comprises, in such a way that from the viewpoint of the user document-oriented working is nonetheless suggested. The user should be given the impression that he is working on independent text or graphics documents with the respective editors or development environments and that the undoing or redoing of operations carried out,—such as copying, deleting, creating, modifying, etc.—is with a high degree of probability possible for each individual processed document separately, although the logical documents affected are not, in database engineering terms, closed off but rather are related to other logical documents and data. An additional challenge in this context is presented by so-called multi-user systems, in which multiple users can simultaneously access the same data stock.

The term "document" introduced in the previous section can, as outlined briefly above, refer both to a single datum and to a combination of a plurality of data definable by the user. A document can in this context be e.g. a representation of a control program in a certain high-level language, e.g. KOP. In the simplest case, the document comprises just a single datum, i.e. for example, just a single function block represented in the form of a contact plan, or a plurality of data of this or a similar type.

In the known approaches which tackle the problems outlined above, an attempt is made on the one hand to avoid the problems from the outset. To this end, document-based software systems or software programs are provided which manage the respective data not jointly, as is taken as the basis in the invention, i.e. in a database for example. In these cases, the documents are managed already in their own files. The undoing or redoing of user actions therefore relates only to one file and thus to the document itself. Relationships between documents and dependencies in relation to other files are produced either by means of so-called loosely coupled references (links) or the dependent data is held redundantly (embedded). A key disadvantage of this approach is deemed to be the lack of global data management and the potentially associated loss of data because the referenced document may be deleted or stored at a different location at any time unchecked and may thus no longer be accessible. The mentioned redundant storage of document information also prevents any centralized modification. In such a case, an adaptation would namely have to be carried out in all the documents containing this information redundantly. The disadvantage of the undesired obsolescence of the document is exacerbated by such a solution.

On the other hand, software program systems which progressively manage documents and data globally, e.g. in a shared database, offer either no function at all for undoing or redoing user actions, or this function does not work in a document-oriented manner, i.e. the undoing or redoing relates only to the user actions last carried out, irrespective of the document currently being accessed. The solution approach of implementing an inverse function for all data manipulation functions now represents a contingency solution to the problem. The development of inverse functions is only conditionally practicable, particularly in complex program systems. Furthermore, the development of such functions is associated with a considerable outlay and associated cost. Document-centered management of the inverse function constitutes a further hurdle, because this would have to be developed in a proprietary manner.

The object of the invention is to indicate a solution in which the above-mentioned disadvantages are avoided or at least their impact reduced, and to do so while retaining a global management of the data being accessed in a database by means of a database interface via which all accesses to the data take place.

To this end, the invention provides in a method of the afore-mentioned type for forming and/or using a buffer on the datum identified via the reference and for storing in this buffer a status of the datum before the access.

The approach according to the invention shifts, as it were, the buffer which was previously possible solely in combination with the central database interface into the database and basically enables the formation of one buffer on each datum respectively. In this way, it also creates the conditions for holding data centrally in a database, such as prevail, as described above, in document-based software systems, for example, in which an access to each document takes place individually, and to this extent a buffer for undoing or redoing user operations can be managed in relation to each document.

To undo an access to a datum, a status of the datum before the access can be restored using the buffer assigned to this datum.

Further advantages and details will emerge from the subclaims. Back-references used therein point to further development of the subject matter of the main claim by the features of the respective subclaim; they are not to be interpreted as relinquishing the attainment of independent substantive protection for the combinations of features of the subclaims to which back-references are made. Furthermore, it must, with regard to an interpretation of the claims, be assumed in the case of a more detailed specification of a feature in a subordinate claim that a restriction of this type is not present in the respectively preceding claims.

If a datum in the database has a relationship to at least one further datum in the database and the further datum is also affected by the access to the datum, it is advantageously provided that, for each datum affected by the access, the status of the respective datum before the access is backed up in its buffer and the backed-up status in the buffer of the or of each further datum is linked to the backed-up status in the buffer of the datum. In this way, a clean assignment, in data technology terms, of the backed-up statuses to the data respectively affected by the access, i.e. to the datum to which the access initially related, and to the or each further datum also affected by the access, is ensured.

To undo an access to a datum by which at least one further datum is affected, it is then also preferably provided that, using the buffer assigned to this datum, a status of the datum before the access and, using any links between the backed-up status in the buffer of the datum and a backed-up status in the buffer of the or of each further datum, a status of each further datum before the access is restored.

If, before undoing an access to a datum, a check is carried out to ascertain whether the backed-up status held in the buffer assigned to this datum is linked to the backed-up status in a buffer of a different datum, it is possible to allow the undo only if the datum is the starting point of the link, i.e., is as it were, the root of the link and not the target of the link and thus constitutes the particular datum via which the access to the database originally took place. While blocking a possibility of undoing an operation in respect of such a further datum which was affected by an access to a different datum restricts the access to further backed-up statuses contained in the buffer assigned to this further datum, at the same time it protects against a backed-up status of such a further datum being erroneously undone in the context of this further datum and not, as alone would be correct, in the context of the particular datum, use of which originally triggered the backing up of the status of the respective further datum.

The operating method outlined above is usually implemented in software, so the invention also relates to a computer program comprising program code instructions, executable by a computer, for implementing the operating method outlined hereinabove and further described hereinbelow, and to a computer program product, in particular a storage medium, comprising such a computer program. Furthermore, the invention also relates to an automation system comprising at least one automation device and a memory assigned to this automation device, in which memory a computer program of the aforementioned type is implemented.

Finally, the invention also relates to use of the operating method outlined hereinabove and further described hereinbelow in software applications which access their data via a single database interface, inventive use of the operating method creating a facility by means of which a plurality of successive accesses to the database relating to different data, and the data which the database comprises, can, in the context of the respective datum, be undone.

BRIEF DESCRIPTION OF THE DRAWINGS

An exemplary embodiment of the invention, which is not to be interpreted as a restriction of the invention, will be explained in detail below with reference to the drawings. Rather, within the scope of the present disclosure, numerous amendments and modifications are possible, in particular such variants and combinations as can, e.g. through combination or modification of individual features described in connection with the features or elements or method steps in the general or special section of the description and contained in the claims and/or the drawings, be derived by a person skilled in the art with regard to achievement of the object and through combinable features lead to a new subject matter or to new method steps or method step sequences. Objects or elements corresponding to one another are labeled with the same reference characters in all the figures.

DETAILED DESCRIPTION OF INVENTION

Figure 1:
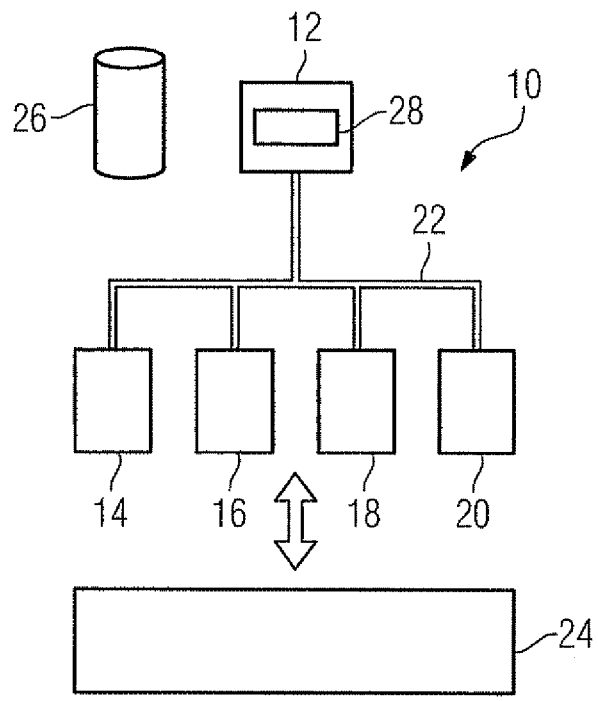
FIG. 1 shows an automation system comprising a database.

FIG. 1 shows in a schematically simplified representation an automation system 10 essentially known in the art, which in the situation represented is formed from a plurality of automation devices 12, 14, 16, 18, 20, which are connected to one another communicatively via a bus 22, e.g. a so-called fieldbus. The automation system 10 is provided on the whole for controlling and/or monitoring a technical process 24, not shown in detail. The automation system 10 has access to a database 26, either in that the database 26 is logically or spatially assigned to one of the automation devices 12, 14, 16, 18, 20, e.g. in that the database 26 is implemented in a memory 28 which the automation device 12 comprises, or in that an access to the database 26 is possible via the bus 22.

Figure 2:
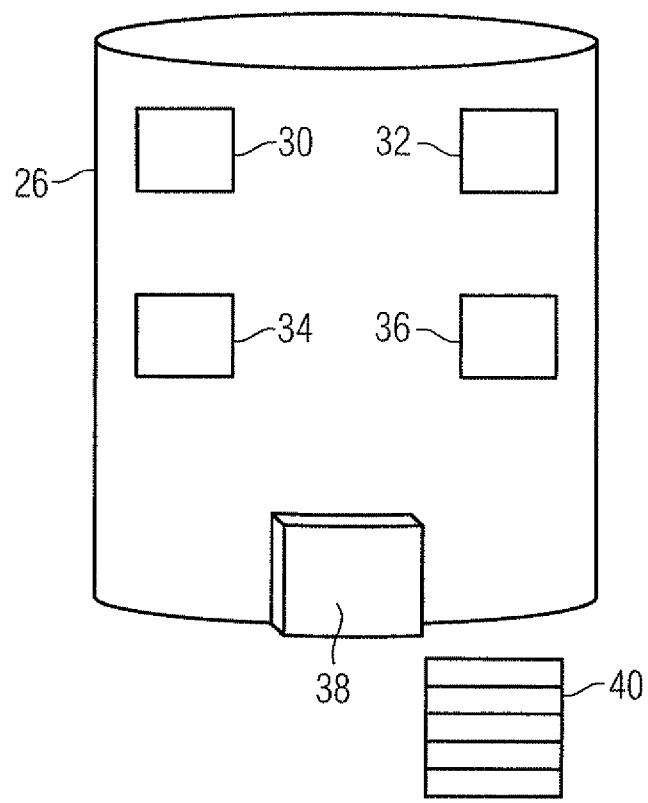
FIG. 2 the database comprising a database interface according to the prior art.

FIG. 2 shows the database 26 in an enlarged view, in order to illustrate in a schematically simplified manner the problems underlying the invention. A plurality of data 30, 32, 34, 36 can be stored in the database 26. Access to each datum 30, 32, 34, 36 which the database 26 comprises requires the use of a database interface 38. The database interface 38 is the only interface via which a defined access to the database 26 is possible. Correspondingly, every access to data 30, 32, 34, 36 which the database 26 comprises takes place via one and the same database interface 38.

Previous approaches which dealt with the problems of undoing and redoing user operations provided that a buffer 40, in which a status of a datum 30, 32, 34, 36 affected by an access can be stored before the access for later restoration, be assigned to the database interface 38. A problem arises under this approach, however, when different data 30, 32, 34, 36 are affected by a sequence of accesses to data 30, 32, 34, 36 in the database 26. In order to distinguish them, the data 30, 32, 34, 36 represented graphically in FIG. 2 are referred to hereinbelow as first datum 30, second datum 32, third datum 34 and fourth datum 36. If, in a hypothetical application situation, firstly an access takes place to the second datum 32 and thereafter an access to the fourth datum 36, the original status of the fourth datum 36 is restorable via the buffer 40, but not the original status of the second datum 32, without previously having restored the original status of the fourth datum 36.

The invention now provides—in short—for duplicating as required a buffer 40 previously formed only "outside" the database 26 (FIG. 2) and for providing the buffers which are produced in this way inside the database 26, and for doing so in combination with the data 30, 32, 34, 36 affected by accesses to the database 26, as will be described hereinbelow.

Figure 3:
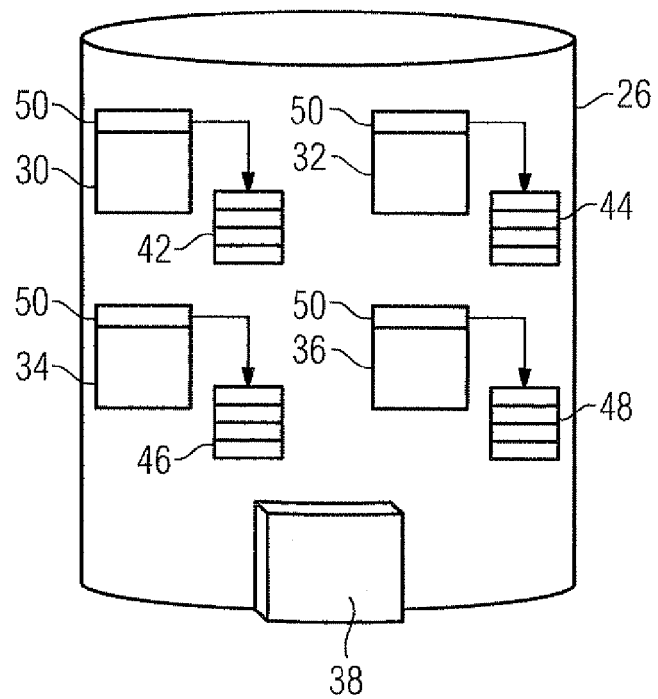
FIG. 3 a database, such as the approach according to the invention is based upon, and FIG. 4 a graphic illustration of dependencies between data held in the database as per FIG. 3 and dependencies arising accordingly between backed-up statuses in the buffers assigned to the data for intermediately storing a status of the respective datum before an access thereto.

FIG. 3 shows once again the database 26 (cf. FIG. 2). A number of data 30, 32, 34, 36 are stored in the database 26 by way of example. All accesses to this data 30, 32, 34, 36 take place via one and the same database interface 38. Unlike the representation in FIG. 2, which essentially represents the situation as is known in the prior art, the invention provides that a separate buffer 42, 44, 46, 48 is or can be assigned to each datum 30, 32, 34, 36 stored in the database 26. The buffers 40, 42, 44, 46, 48, each assigned locally to the respective datum 30, 32, 34, 36, replace the single buffer 40 available for all accesses to the database 26, known in the prior art (FIG. 2).

For the link between datum 30, 32, 34, 36 and buffer 42, 44, 46, 48, the invention provides that when an access to the database 26 takes place, more precisely when an access to a datum 30, 32, 34, 36 in the database 26 takes place, the respective datum 30, 32, 34, 36, to which the access relates is identified by a unique reference 50. Eligible for use as such a reference 50 is an initial address of the data which the respective datum 30, 32, 34, 36 comprises in the memory 28 which the database 26 comprises. Equally, a unique identification, for example in the manner of a filename or the like, is also eligible for use as a reference 50. Each buffer 40, 42, 44, 46, 48 assigned to a datum 30, 32, 34, 36 is linked to the respective reference 50 uniquely identifying the datum 30, 32, 34, 36.

Unlike the situation outlined in the final explanation of FIG. 2, an undoing or redoing of accesses to data 30, 32, 34, 36 stored in the database 26 is, in relation to the respective datum 30, 32, 34, 36, to which the access has taken place, now possible by means of the plurality of buffers 42, 44, 46, 48 held, as it were, inside the database 26. If, for example,— using the same terminology as lastly in connection with FIG. 2—firstly an access to the second datum 32 takes place, the previous status of this datum 32 is backed up in the buffer 44 assigned to this datum 32 via its reference 50. If an access then takes place to the fourth datum 36, the previous status of this datum 36 is backed up in the buffer 48 assigned to this datum 36. By means of statuses backed up in this manner, it is easily possible either to undo the backed-up status of the fourth object 36 or the backed-up status of the second object 32, because the backed-up statuses are respectively filed in independent buffers 44, 48.

Figure 4:
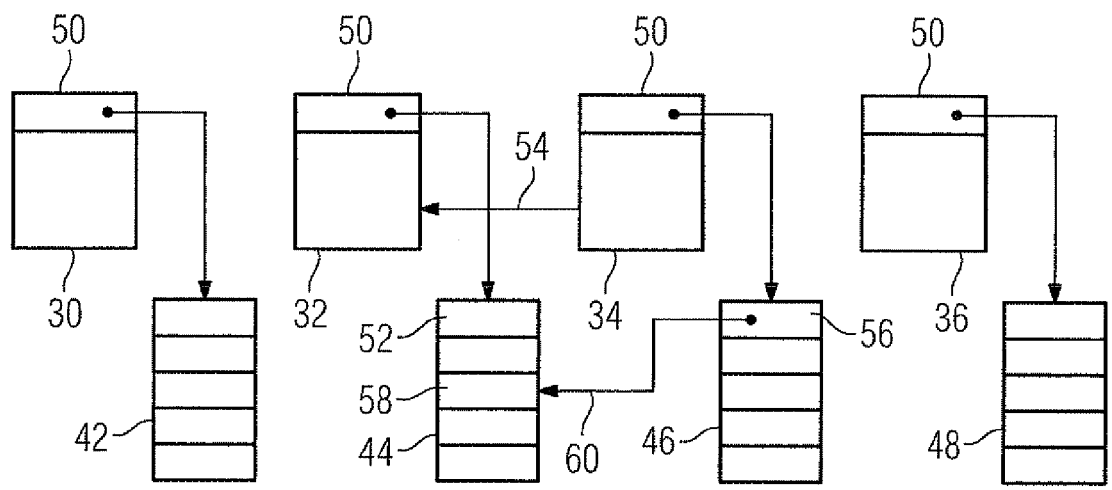

To illustrate a special feature of the inventive operating method in the case of dependencies between data 30, 32, 34, 36 stored in the database 26 (FIG. 3), FIG. 4 shows only this data 30, 32, 34, 36, so as not to render it unnecessarily difficult to acquire an overview by also showing the database 26 itself and the single database interface 38.

If initially a comparatively simple constellation is assumed, in which no relationships exist between the datum 30, 32, 34, 36 which is accessed and other data 30, 32, 34, 36 in the database 26, then when the second datum 32 is accessed, for example, the status of this datum 32 before the access is backed up in the buffer assigned to this datum 32 via its reference 50. The backed-up status is filed as a first backed-up status 52 in the buffer 44. If an access then takes place to the third datum 34, and this datum has a relationship 54 e.g. to the second datum 32, as a further datum 30, 32, 34, 36 of the database 26, and optionally further identical or similar relationships (not shown) and the or each further datum 32 referenced by such a relationship 54 is also affected by the access to the third datum 34, for each datum 34, 32 affected by the access, the status of the respective datum 34, 32 before the access is backed up in its buffer 46, 44. In this way, a second and a third backed-up status 56, 58 are produced in the event, taken as an example, of the third datum 34 being accessed, the second backed-up status 56 representing the status of the third datum 34 before the access and the third backed-up status 58 representing the status of the second datum 32 before the access. The statuses 56, 58 backed up in this way are stored in the buffers 44, 46 assigned to the respective data 32, 34.

To undo an access to a datum 30, 32, 34, 36 which has relationships with at least one further datum 30, 32, 34, 36 in the database 26, such that not only the datum 30, 32, 34, 36 actually accessed but at least one further datum 30, 32, 34, 36 is also affected by the access, the invention provides that, using the buffer 42, 44, 46, 48 assigned to the datum 30, 32, 34, 36 actually accessed, a status of this datum before the access is restored. In order also to undo the status of the or of each datum 30, 32, 34, 36 likewise affected by such an access, the invention provides that the statuses 56, 58 backed up upon access are assigned to one another by a link 60. When undoing an access of the type outlined above, in which at least one further datum 30, 32, 34, 36 is also affected, a status of the further datum 30, 32 before the access is then restored in conjunction with the redoing of the backed-up status 52 of the datum 30, 32, 34, 36 actually accessed using any links 60 between the respective backed-up status 56 in the buffer of the accessed datum 30, 32, 34, 36 and a backed-up status 56 in the buffer 42, 44, 46, 48 of the further datum 30, 32, 34, 36.

The complexity of any relationships 54 between the data 30, 32, 34, 36 stored in the database 26 is not restricted in any way by the operating method according to the invention and the scenario outlined with only one relationship 54 is chosen here purely on the grounds that it can be represented in a comparatively simple manner. In respect of the backed-up statuses 52, 56, 58 which are produced in conjunction with the access, a complexity of relationships 54 between the data 30, 32, 34, 36 stored in the database 26 also correlates directly with a corresponding complexity of the links 60 produced between the backed-up statuses 52, 56, 58 in the buffers 42, 44, 46, 48.

A further special feature of the invention is that, before undoing an access to a datum 30, 32, 34, 36, a check is carried out to ascertain whether the backed-up status 58 held in the buffer 42, 44, 46, 48 assigned to this datum 30, 32, 34, 36 is linked to a backed-up status 56 in a buffer 42, 44, 46, 48 of another datum 30, 32, 34, 36. If such a situation is detected, the access concerned is namely one which, to avoid inconsistencies, must not be undone in the context of the respective datum (cf. second datum 32 and its backed-up status as third backed-up status 58). The backed-up status of such a datum 30, 32, 34, 36 should preferably be restored only if the restoration takes place in the context of the respective datum 30, 32, 34, 36 to which the access originally related (cf. in FIG. 4 the third datum 34 and its backed-up status as second backed-up status, which is linked via the link 56 to the backed-up status as third backed-up status 58 of the second datum 32 likewise affected by the access to the third datum 34). Thus, in such a constellation, the undoing of a backed-up status 58 in a buffer 42, 44, 46, 48 which is associated via a link 60 with at least one other backed-up status 56 in one of the buffers 42, 44, 46, 48 is not possible. The aforesaid applies, however, only if the respective datum, here the second datum 32, is directly or indirectly the target of a link 60. In the situation represented in FIG. 4, the third backed-up status 58 is itself the target of the link 60, so that indirectly the buffer 44 assigned to the second datum 32 can be interpreted as the target of the link 60, and to that extent the second datum 32 itself can indirectly also be interpreted as the target of the link. The undoing of an access of this type is nevertheless readily possible if the respective datum, here the third datum 34, is the starting point of the link 60. Here, in the situation represented according to FIG. 4, the second backed-up status 56 is the starting point of the link to the third backed-up status 58, the second backed-up status being stored in the buffer 46 assigned to the third datum 34, so that the buffer assigned to this datum 34 can indirectly be interpreted as the starting point of the link 60 and in the broader context, the third datum 34 itself can also be interpreted as the starting point of the link 60.

In accordance with the approach according to the invention, the distributed management of buffers 42, 44, 46, 48 functioning as undo/redo buffers on defined representatives, e.g. a unique reference 50, of objects, documents or general data 30, 32, 34, 36 in a database 26, suggests a "document-local" undo/redo. A key advantage which emerges from this for the user of the software system is a system behavior like that to which he will be accustomed e.g. from today's common office applications. From the user's point of view, the data 30, 32, 34, 36 managed and/or processed as documents or the like in editors, development environments or object managers will appear like self-contained, separately managed documents. The undo/redo function can thus for the first time be offered directly in the context of the respective document, i.e. in the context of the respective datum 30, 32, 34, 36.

The integrative approach of the solution idea proposed avoids contingency solutions such as the development of proprietary inversion functions. Furthermore, no undo/redo mechanisms which are based exclusively on the sequence of data manipulation (cf. FIG. 2) are foisted upon the user. In complex software program systems comprising many different document types and/or applications accessing them, such as editors, development environments, object managers or the like, this would not meet expectations. The object modeling of the software program system permits dependencies and relationships between the various data 30, 32, 34, 36. The method does not require any self-contained documents as a datum 30, 32, 34, 36 in the data organization, but even permits relationships between the individual data 30, 32, 34, 36 and so, when an access to a datum 30, 32, 34, 36 takes place by which at least one further datum 30, 32, 34, 36 is also affected, allows on the one hand the affected data 30 to 36 to be backed up and, on the other to be restored, in the context of the respective datum to which the access originally related.

The invention can thus briefly be represented as follows:

A method for operating an automation system 10 is indicated, in which automation-specific data 30, 32, 34, 36 is filed in a database 26, an access to the data 30, 32, 34, 36 being carried out using a database interface 38, all accesses to the data 30, 32, 34, 36 taking place via one and the same database interface 38 and, in the event of an access to the database 26, a datum 30, 32, 34, 36 to which the access relates being identified by a unique reference 50, wherein on the datum 30, 32, 34, 36 identified via the reference 50 a buffer 40 is formed or used and a status of the datum 30, 32, 34, 36 is backed up in the buffer 40.

The invention claimed is:

1. A method for operating an automation system, the automation system in communication with a database comprising a plurality of data accessible via a single database interface, comprising:
   storing a plurality of data in a database wherein each datum of the plurality of data comprises a unique reference to uniquely identify the datum during access and wherein one or more dependencies exist between one or more of the datum;
   assigning for each datum a separate respective buffer via the unique reference, each separate respective buffer for storing back-up statuses of the datum;
   in conjunction with accessing the data via a single database interface using the unique reference:
      (a) storing a backup of a status of the datum to which the access relates in the separate respective buffer for that datum;
      (b) for each further datum for which a dependency exists with the datum to which the access relates and that will be affected by such access, storing a backup of a status of the further datum in the separate respective buffer for that further datum; and
      (c) providing a link between each of the stored backups of statuses when dependency exists, wherein the backup of the status of the datum to which the access relates comprises a starting point of the link and the backup of the status of each further datum comprises a target of the link;
   in conjunction with undoing the access to the datum, restoring the status of the datum from the backup of the status stored in the separate respective buffer for that datum.

2. The operating method as claimed in claim 1, wherein in conjunction with undoing the access to the datum when dependency exists with further datum, using the separate respective buffer for that further datum to restore the status of the further datum from the backup of the status stored in the separate respective buffer for that further datum using the link between each of the stored backups of statuses.

3. The operating method as claimed in claim 1, wherein in conjunction with undoing the access to the datum, checking whether the backup of the status of the datum comprises the starting point of the link and allowing the undoing of the access only if the backup of the status of the datum comprises the starting point of the link.

4. The operating method as claimed in claim 1, further comprising providing a plurality of software applications accessing data related to the software applications via the single database interface, wherein a plurality of successive accesses related to different data are undone.

5. The operating method as claimed in claim 1, wherein at least one datum is a function block represented in the form of a contact plan.

6. A computer readable medium encoded with a computer program for providing a method for operating an automation system, the automation system in communication with a database comprising a plurality of data accessible via a single database interface, wherein the method comprises:

storing a plurality of data in a database wherein each datum of the plurality of data comprises a unique reference to uniquely identify the datum during access and wherein one or more dependencies exist between one or more of the datum;

assigning for each datum a separate respective buffer via the unique reference, each separate respective buffer for storing back-up statuses of the datum;

in conjunction with accessing the data via a single database interface using the unique reference:

(a) storing a backup of a status of the datum to which the access relates in the separate respective buffer for that datum;

(b) for each further datum for which a dependency exists with the datum to which the access relates and that will be affected by such access, storing a backup of a status of the further datum in the separate respective buffer for that further datum; and (c) providing a link between each of the stored backups of statuses when dependency exists, wherein the backup of the status of the datum to which the access relates comprises a starting point of the link and the backup of the status of each further datum comprises a target of the link;

in conjunction with undoing the access to the datum, restoring the status of the datum from the backup of the status stored in the separate respective buffer for that datum.

7. The computer readable medium encoded with a computer program as claimed in claim 6, wherein at least one datum is a function block represented in the form of a contact plan.

8. The computer readable medium encoded with a computer program as claimed in claim 6, wherein in conjunction with undoing the access to the datum when a dependency exists with further datum, using the separate respective buffer for that further datum to restore the status of the further datum from the backup of the status stored in the separate buffer for that further datum using the link between each of the stored backups of statuses.

9. The computer readable medium encoded with a computer program as claimed in claim 6, in conjunction with undoing the access to the datum, checking whether the backup of the status of the datum comprises the starting point of the link and allowing the undoing of the access only if the backup of the status of the datum comprises the starting point of the link.

10. The computer readable medium encoded with a computer program as claimed in claim 6, further comprising providing a plurality of software applications accessing data related to the software applications via the single database interface, wherein a plurality of successive accesses related to different data are undone.

\* \* \* \* \*